US012418688B2

(12) United States Patent
Gong

(10) Patent No.: US 12,418,688 B2
(45) Date of Patent: Sep. 16, 2025

(54) LIVE VIDEO PROCESSING METHOD AND APPARATUS, DEVICE AND MEDIUM

(71) Applicant: Beijing Zitiao Network Technology Co., Ltd., Beijing (CN)

(72) Inventor: Jingwen Gong, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 267 days.

(21) Appl. No.: 18/344,674

(22) Filed: Jun. 29, 2023

(65) Prior Publication Data

US 2024/0007689 A1   Jan. 4, 2024

(30) Foreign Application Priority Data

Jun. 30, 2022   (CN) .......................... 202210772659.3

(51) Int. Cl.
*H04N 21/234*   (2011.01)
*H04N 21/2187*   (2011.01)
(Continued)

(52) U.S. Cl.
CPC ... *H04N 21/23412* (2013.01); *H04N 21/2187* (2013.01); *H04N 21/4318* (2013.01); *H04N 21/472* (2013.01)

(58) Field of Classification Search
CPC ......... H04N 21/23412; H04N 21/2187; H04N 21/4318; H04N 21/472; H04N 21/431;
(Continued)

(56) References Cited

U.S. PATENT DOCUMENTS

2017/0302719 A1   10/2017   Chen et al.
2023/0101302 A1*   3/2023   Chen ................... H04N 21/4316
                                                                      725/38
(Continued)

FOREIGN PATENT DOCUMENTS

CN   107333165 A   11/2017
CN   107908447 A    4/2018
(Continued)

OTHER PUBLICATIONS

China National Intellectual Property Administration, Office Action and Search Report Issued in Application No. 202210772659.3, Jul. 28, 2023, 14 pages.
(Continued)

*Primary Examiner* — Oschta I Montoya
(74) *Attorney, Agent, or Firm* — Alleman Hall & Tuttle LLP

(57) ABSTRACT

A live video processing method and apparatus, a device and a medium are provided. The displayed live streaming room interface includes a first display area and a second display area. A display image corresponding to a first host is displayed in the first display area, and a display image corresponding to a second host is displayed in the second display area. Once the display switching request is received, the masking layer is displayed on the first display area and the second display area. When the display switching is completed, the masking layer is canceled on the first display area and the second display area, the display image corresponding to the second host is displayed in the first display area, and the display image corresponding to the first host is displayed in the second display area.

20 Claims, 4 Drawing Sheets

(51) Int. Cl.
  *H04N 21/431* (2011.01)
  *H04N 21/472* (2011.01)
(58) Field of Classification Search
  CPC .......... H04N 21/4312; H04N 21/4316; H04N 21/485
  See application file for complete search history.

(56) References Cited

U.S. PATENT DOCUMENTS

| | | | |
|---|---|---|---|
| 2023/0308710 A1* | 9/2023 | He | G11B 27/031 |
| 2023/0316625 A1 | 10/2023 | Yang | |
| 2024/0015340 A1 | 1/2024 | Luo | |
| 2024/0281103 A1* | 8/2024 | Gao | H04N 21/4788 |
| 2024/0333782 A1* | 10/2024 | Koehler | H04N 7/155 |

FOREIGN PATENT DOCUMENTS

| | | |
|---|---|---|
| CN | 108989830 A | 12/2018 |
| CN | 111093087 A | 5/2020 |
| CN | 111970524 A | 11/2020 |
| CN | 112104913 A | 12/2020 |
| CN | 112764845 A | 5/2021 |
| CN | 113407141 A | 9/2021 |
| CN | 113949888 A | 1/2022 |
| CN | 114025187 A | 2/2022 |
| CN | 114245158 A | 3/2022 |
| CN | 114339363 A | 4/2022 |
| CN | 115086745 A | 9/2022 |
| EP | 4184919 A1 | 5/2023 |
| WO | 2017101320 A1 | 6/2017 |
| WO | 2018095129 A1 | 5/2018 |
| WO | 2022087920 A1 | 5/2022 |
| WO | 2022110591 A1 | 6/2022 |

OTHER PUBLICATIONS

Sun, X. et al., "A familiar stranger: Research on the relationship between swiping gifts and privacy in webcast," Shanghai Journalism Review, Issue 5, May 20, 2020, 12 pages. Submitted with English abstract.

ISA China National Intellectual Property Administration, International Search Report Issued in Application No. PCT/CN2023/104410, Sep. 30, 2023, WIPO, 18 pages.

China National Intellectual Property Administration, Notice of Allowance issued in Chinese Application No. 202210772659.3, Dec. 29, 2023, 6 pages.

* cited by examiner

LIVE VIDEO PROCESSING METHOD AND APPARATUS, DEVICE AND MEDIUM

CROSS-REFERENCE TO RELATED APPLICATIONS

This application claims priority to Chinese application NO. 202210772659.3, titled "LIVE VIDEO PROCESSING METHOD AND APPARATUS, DEVICE AND MEDIUM", filed Jun. 30, 2022, with the China National Intellectual Property Administration, which is incorporated herein by reference in its entirety.

TECHNICAL FIELD

The present application relates to the field of computer technology, and in particular, to a live video processing method and apparatus, a device, and a medium.

BACKGROUND

With the continuous development of live streaming technology, a growing number of users socialize through live streaming. In order to increase the fun of the live streaming, users co-host or compete with each other during the live streaming to attract more viewers. In the scenario of co-hosting, users may need position-switching, such as team switching in the competition. In the conventional technology, an instantaneous "hopping" occurs to the video stream in the live streaming room during the position switching, causing the video stream to stutter and affecting the viewing experience of the audience.

SUMMARY OF THE INVENTION

In view of this, a live video processing method and apparatus, a device, and a medium are provided according to embodiments of the present disclosure.

In order to achieve the above object, the present application provides the following technical solutions.

In a first aspect of the present disclosure, a live video processing method is provided. The method includes:
 displaying a live streaming room interface, the live streaming room interface comprising a first display area and a second display area, displaying, in the first display area, a display image corresponding to a first host, and displaying, in the second display area, a display image corresponding to a second host;
 in response to a display switching request, displaying a masking layer on the first display area and the second display area;
 in response to the completion of switching, cancelling the masking layer on the first display area and the second display area, and displaying the display image corresponding to the second host in the first display area, and displaying the display image corresponding to the first host in the second display area.

In a second aspect of the present disclosure, a live video processing apparatus is provided. The apparatus includes:
 a first display unit configured to display a live streaming room interface comprising a first display area and a second display area, display, in the first display area, a display image corresponding to a first host, and display, in the second display area, a display image corresponding to a second host;
 a second display unit configured to: in response to a display switching request, display a masking layer on the first display area and the second display area;
 a third display unit configured to: in response to the completion of switching, cancel the masking layer on the first display area and the second display area, and display the display image corresponding to the second host in the first display area, and display the display image corresponding to the first host in the second display area.

In a third aspect of the present disclosure, an electronic device is provided. The device includes a processor and a memory.

The memory is configured to store instructions or computer programs.

The processor is configured to execute the instructions or the computer programs in the memory, to cause the electronic device to execute the method according to the first aspect.

In a fourth aspect of the present disclosure, a computer readable storage medium having instructions stored thereon is provided. The instructions, when running on a device, cause the device to perform the method according to the first aspect.

In a fifth aspect of the present disclosure, a computer program product is provided. The computer program product includes computer programs or instructions. The computer programs/instructions, when executed by a processor, cause the method according to the first aspect to be performed.

It can be seen that the embodiments of the present disclosure have following advantages.

In an embodiment of the present disclosure, the live streaming room interface displayed includes a first display area and a second display area. A display image corresponding to a first host is displayed in the first display area, and a display image corresponding to a second host is displayed in the second display area. After the display switching request is received, the masking layer is displayed on each of the first display area and the second display area, to mask the image displayed on each of display areas through the masking layer. When the display switching is completed, the display masking layers are canceled on the first display area and the second display area, and the display image corresponding to the second host is displayed in the first display area, and the display image corresponding to the first host is displayed in the second display area. That is, the display positions of the first host and the second host in the live streaming room are exchanged under the cover of the masking layers.

BRIEF DESCRIPTION OF THE DRAWINGS

In order to more clearly illustrate technical solutions in the embodiments of the present disclosure or in the conventional technology, the drawings to be used in the description of the embodiments or in the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

Figure 1:
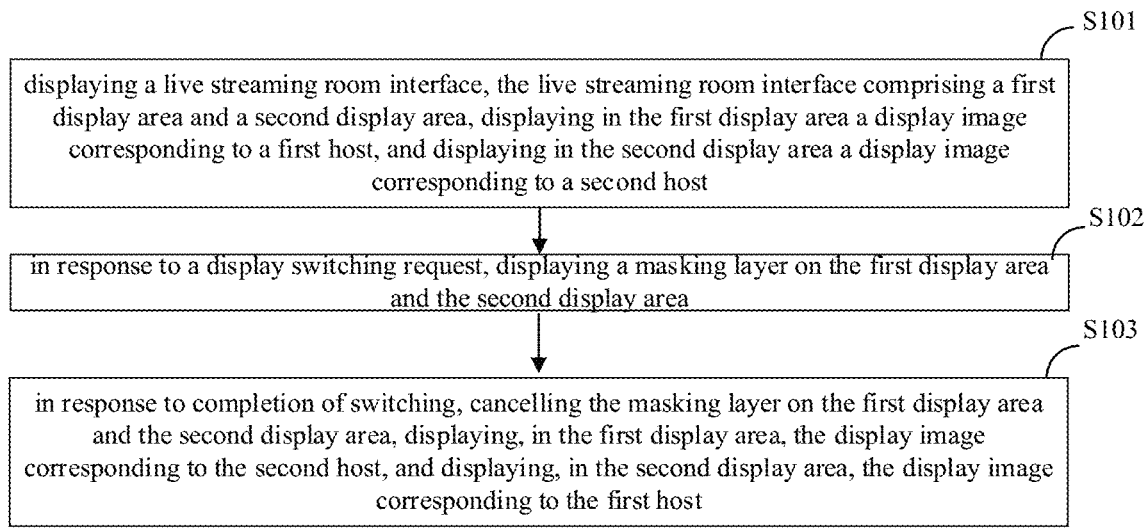
FIG. 1 is a flowchart of a live video processing method according to an embodiment of the present disclosure.

In order to understand the solutions of the present disclosure better by those skilled in the art, the technical solutions of embodiments of the present disclosure are clearly and completely described below in conjunction with the drawings of the embodiments of the present disclosure. Apparently, the embodiments described below are only some embodiments of the present disclosure, rather than all the embodiments. All the other embodiments obtained by those skilled in the art based on the embodiments in the present application without any creative work fall into the scope of the present application.

In a live streaming scenario, there may be a need to adjust display positions of multiple hosts in a case that multiple hosts co-host in a live streaming room. For example, a host displayed in a central position (C position) of the live streaming room needs to be switched to another host. Alternatively, in a case of transition from multiple-user co-hosting to a team competition in the live streaming room, if the hosts belonging to the same team are not displayed on the same side, positions of the hosts need to be exchanged in order to display the teams under respective PK (Player-killing) bars, to facilitate users to know the PK progress and the hosts corresponding to each PK team. At present, as streaming technology is adopted on the viewing side, an instantaneous hopping of video stream in the live streaming room occurs when the display positions of the hosts are switched, causing an illusion of video stutter for a viewer. In addition, the hopping of the host display position without information prompting will be misunderstood by the user as a system failure. The term "co-hosting" refers to the scenario that multiple players may interact by using the microphones at the same time in a microphone-order mode to achieve multiplayer interaction, program communication and other needs. Co-hosting in a live streaming is a new way of social interaction which uses voice technology to improve interactive communication on the basis of live streaming.

Based on this, the present disclosure provides a live video processing method. Specifically, before switching, the displayed live streaming room interface includes a first display area and a second display area. A display image corresponding to a first host is displayed in the first display area, and a display image corresponding to a second host is displayed in the second display area. In response to receiving a display switching request, a masking layer is displayed on the first display area and the second display area, to mask the images displayed on the display areas. When the display switching is completed, the display masking layers are canceled on the first display area and the second display area, and the display image corresponding to the second host is displayed in the first display area, and the display image corresponding to the first host is displayed in the second display area. That is, the display positions of the first host and the second host in the live streaming room are exchanged under the cover of the masking layers, to avoid the instantaneous hopping of the video stream on the viewing side to ensure the smooth viewing.

It can be understood that, the user is informed of a type of involved personal information and an application range and application scenario of the personal information in an appropriate manner, and user permission is obtained before the technical solution of the embodiments of the present disclosure is implemented.

For example, prompt information is sent to the user in response to receiving a request initiated from the user, to explicitly inform the user that the requested operation may acquire and use personal information of the user. Therefore, the user may voluntarily choose whether or not to provide the personal information to the electronic device, application, server, storage medium, or other software or hardware for implementing the solutions according to the present disclosure.

As an optional but non-restrictive implementation, in response to receiving the request initiated from the user, the prompt information may be sent to the user in a way of pop-up information, for example. The prompt information may be presented as a text in the pop-up information. In addition, a selection control may be carried in the pop-up information, by which the user may select "agree" or "disagree" to provide personal information to the electronic device.

It can be understood that the above process of informing the user and obtaining permission from the user is only illustrative, and the implementation of the present disclosure is not limited thereto. Other implementations that conform to the relevant laws and regulations may also be applied.

For better understanding, the technical solutions provided in the embodiments of the present disclosure will be described below in conjunction with the accompanying drawings.

FIG. 1 is a flowchart of a live video processing method according to an embodiment of the present disclosure. The method may be implemented by a live video processing device, which may be an electronic device. The electronic device may include a device with communication function such as a mobile phone, a tablet computer, a notebook computer, a desktop computer, a vehicle terminal, a wearable electronic device, an all-in-one machine, a smart home device, and may be a device simulated with a virtual machine or an emulator. As shown in FIG. 1, the method may include the following steps.

In S101, a live streaming room interface is displayed.

The live streaming room interface includes a first display area and a second display area. A display image corresponding to a first host is displayed in the first display area, and a display image corresponding to a second host is displayed in a second display area.

In S102, in response to a display switching request, a masking layer is displayed on the first display area and the second display area.

In this embodiment, in response to receiving a display switching request, a masking layer (for example, a first masking layer) is displayed on the first display area and a masking layer (for example, a second masking layer) is displayed on the second display area to mask the images displayed on the display areas, so as to switch the display images with the presence of the masking layers. The masking layer masks the image in the area associated to the masking layer.

The display switching request is configured to request to switch the display images displayed on the first display area and the second display area, and is triggered in the following manners.

In one case, in a case that the image displayed at a central position of the live streaming room needs to be switched, a display switching request is sent, where the display switching request is a request to switch the display areas of the first host and the second host. Switching the image displayed at a central position is triggered by: a host triggering a switching operation in the live streaming room. For example, in a case that the first display area is the display area corresponding to the central position of the live streaming room, if the first host triggers the switching operation in the live streaming room, a live streaming client sends the display switching request to a corresponding server in response to the switching operation. Alternatively, if a resource value obtained by another host in the live streaming room is greater than or equal to a preset resource threshold, the live streaming client actively sends the display switching request to the server. For example, in a case that the first display area is the display area corresponding to the central position of the live streaming room and the first host is located at the central position, the display switching is triggered if the resource value obtained by the second host is equal to the preset resource threshold. Alternatively, a display duration threshold of each host in the central position is preset. In a case that the display duration of a certain host in the central position is equal to the display duration threshold, the display switching is triggered.

Figure 2A:
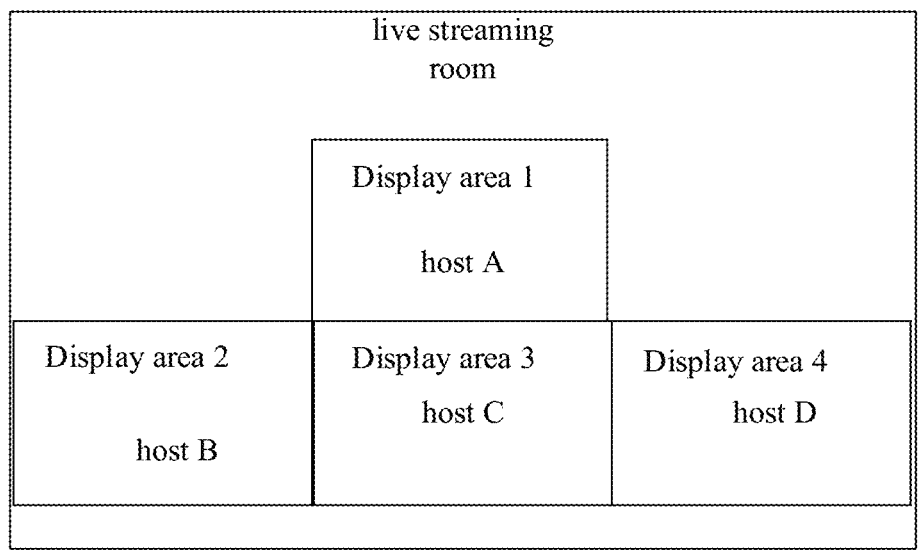
FIG. 2a is a schematic diagram showing a live streaming scenario according to an embodiment of the present disclosure.

For example, in a live streaming room scenario as shown in FIG. 2a, the live streaming room includes four display areas: a display area 1 in which a display image of a host A is displayed, a display area 2 in which a display image of a host B is displayed, a display area 3 in which a display image of a host C is displayed, and a display area 4 in which a display image of a host D is displayed, where the display area 1 is located at the central position. The display switching request is sent in response to the host A triggering the switching operation in the live streaming room.

In another case in which multiple hosts in the live streaming room perform co-hosting and team up for PK, if live streaming windows corresponding to different hosts belonging to the same live streaming team are not displayed on the same side, the display positions of the live streaming windows need to be adjusted. Specifically, before PK starts, the live streaming windows corresponding to the hosts belonging to the same live streaming team are displayed on the same side, such as a left or right side, in order to enable a viewer to intuitively know which hosts belong to the same live streaming team. In a case that a live streaming window corresponding to any host of the same live streaming team is not displayed on the same side of the live streaming room, the display switching request is triggered. In this case, the display image corresponding to the first host belonging to a first live streaming team is displayed in the first display area, the display image corresponding to the second host belonging to a second live streaming team is displayed in the second display area, and the display switching request is a request to switch the live streaming teams to which the first host and the second host belong. The server may trigger display switching when it detects that the live streaming windows corresponding to the hosts belonging to the same live streaming team are not on the same side. Alternatively, the host may trigger the display switching through the live streaming client.

Specifically, in the process of teaming up to PK, the host who initiates the team may select team members through the client. In response to a selection operation triggered by the host, the display switching is triggered. Specifically, a selection control is included on the live streaming client. A member selection interface is displayed in response to trigger of the selection control by the host. The host may select team members on the member selection interface. In response to a selection operation triggered by the host, the display switching request is sent to the live streaming server.

The live streaming window corresponding to each host in the first live streaming team is located on a first side of the live streaming room, and the live streaming window corresponding to each host in the second live streaming team is located on a second side of the live streaming room. Specifically, the live streaming room is divided into a left display area and a right display area. The first side is the left display area of the live streaming room, and the second side is the right display area of the live streaming room.

Figure 2B:
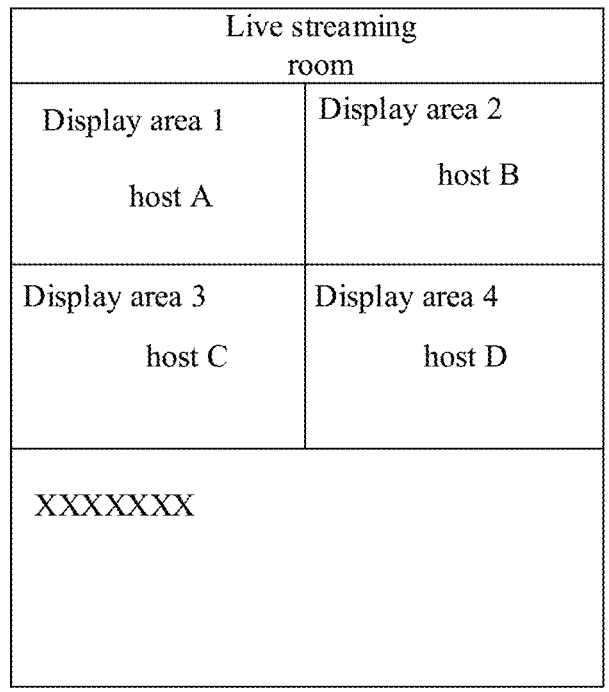
FIG. 2b is a schematic diagram showing another live streaming scenario according to an embodiment of the present disclosure.

For example, in the transition from four-user co-hosting into a team competition, as shown in FIG. 2b, the host A and host B belong to team 1, the host C and host D belong to team 2. The display area 1 is configured to display a live video stream of the host A, the display area 2 is configured to display a live video stream of the host B, the display area 3 is configured to display a live video stream of the host C, and the display area 4 is configured to display a live video stream of the host D. However, the host A and host B are located on different sides from each other, and the host C and host D are also located on different sides from each other. Thus the first host is the host A, the second host is the host D, and the first display area is the display area 1, and the second display area is the display area 4. Alternatively, the first host is the host B, the second host is the host C, and the first display area is the display area 2, and the second display area is the display area 3.

Figure 2C:
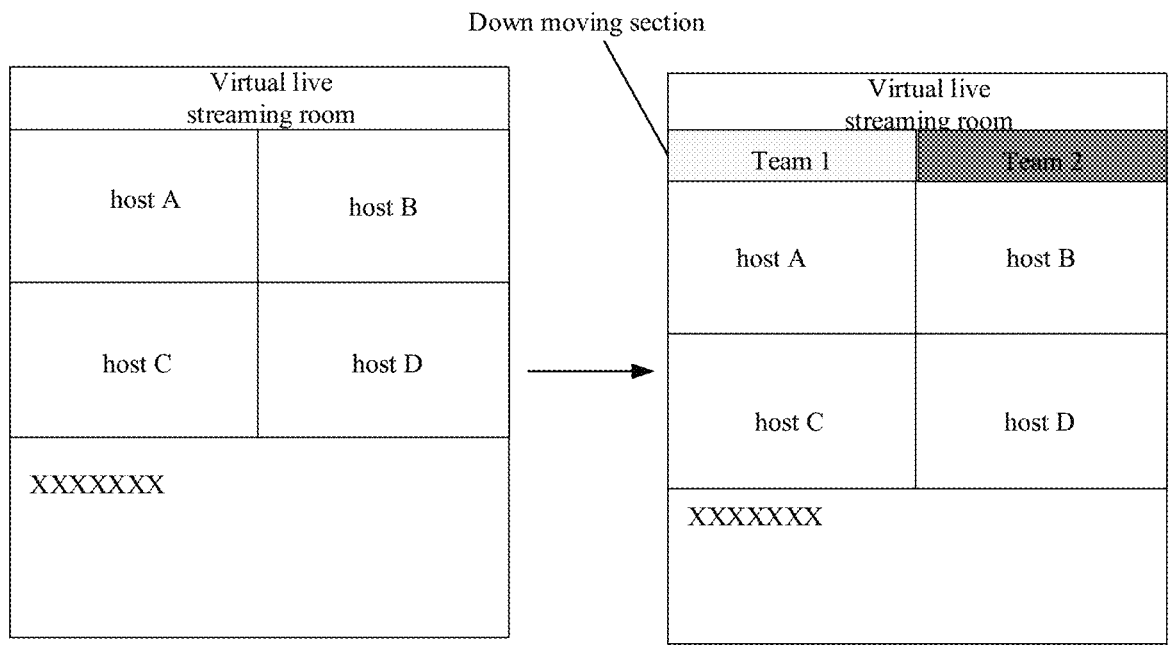
FIG. 2c is a schematic diagram showing adjustment of a live streaming window according to an embodiment of the present disclosure.

In response to the completion of teaming-up of multiple hosts in the live streaming room and before the start of competition, the entire live streaming window of the live streaming room is moved down. A competition progress bar respectively corresponding to each team is displayed in a down moving section. The competition progress bar is used to represent an achievement of a team during the competition. As shown in FIG. 2c, the live streaming window in the right portion of FIG. 2c moves down relative to the live streaming window in the left portion of FIG. 2c. The competition progress bar of team 1 and the competition progress bar of team 2 are displayed in the down moving section.

In an embodiment of the present disclosure, in order to enable a user watching the live streaming room to intuitively know that the display image of which host is displayed in a masked display area, a host identification of the host corresponding to the display image displayed in the masked display area is displayed on the masking layer, so that the user may directly know the host corresponding to this display area, reducing the user's understanding cost. The host identification may include a host avatar.

Figure 2D:
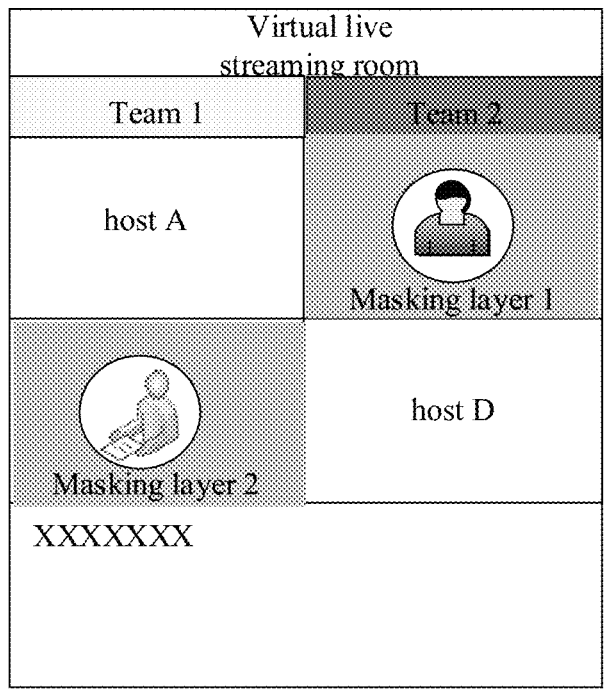
FIG. 2d is a schematic diagram showing covering with a masking layer according to an embodiment of the present disclosure.

For example, in an application scenario shown in FIG. 2b, in a case that the first host is the host B and the second host is the host C, a masking layer covers on the display area 2 corresponding to the host B, and another masking layer covers on the display area 3 corresponding to the host C. As shown in FIG. 2d, the host avatar corresponding to a masked host is displayed on each masking layer.

The host avatar may be an avatar of the host obtained from the live streaming window corresponding to the host. Specifically, the host avatar is an image set by the host for display.

In S103, in response to the completion of switching, the display masking layer on the first display area and the second display area is cancelled, the display image corresponding to the second host is displayed in the first display area, and the display image corresponding to the first host is displayed in the second display area.

When the masking layer is displayed in the first display area and the second display area, the exchange of display images in the two display areas is triggered. That is, the display image displayed in the first display area is switched from the display image corresponding to the first host to the display image corresponding to the second host, and the display image displayed in the second display area is switched from the display image corresponding to the second host to the display image corresponding to the first host, to complete the switching. After the switching operation is completed, the display masking layers are cancelled so that the live video stream can be browsed in the live streaming room. Since the switching of the display image described above is performed under the masking layers, the viewer is not aware of the hopping of the video stream. In an embodiment, the above display switching may be performed both on the host side and on the viewing side.

In an embodiment of the present disclosure, the display image corresponding to the first display area is exchanged with the display image corresponding to the second display area in the two implementation manners.

In one implementation, a display container on the first display area is exchanged with a display container on the second display area, so as to exchange the display image corresponding to the first display area with the display image corresponding to the second display area. The display container is configured to carry a corresponding video stream during the live streaming of the host. Specifically, when a live streaming is initiated by a host through a live streaming platform, the live streaming platform allocates a display container for the host, with different hosts corresponding to different display containers. In a case that the display image displayed in the first display area needs to be exchanged with the display image displayed in the second display area, the display container corresponding to the host displayed in the first display area is exchanged with the display container corresponding to the host displayed in the second display area.

On the host side, the display container and the video stream carried by the display container are synchronously subjected to exchange. That is, the display container and display image on the first display area are synchronously subjected to exchange with the display container and display image on the second display area, so as to ensure that a post-switching effect can be browsed in time on the host side. On the viewing side, the video stream is switched first, and subsequently the display container is switched. That is, the display image corresponding to the first display area is exchanged with the display image corresponding to the second display area, and subsequently the display container on the first display area is exchanged with the display container on the second display area. Due to the large number of users on the viewing side, the switching mode described above prevents the switching from occupying too much system resources.

In the other implementation, the live video stream in the display container on the first display area is exchanged with the video stream in the display container on the second display area, so as to exchange the display image corresponding to the first display area with the display image corresponding to the second display area. In this implementation, the display containers on the display areas are not exchanged, but only the live video streams in the display containers are exchanged, so that the display images displayed on the display areas are exchanged.

In an embodiment of the present disclosure, in order to help the user's understanding of the exchange of the display images of the hosts, the host identifications on the masking layers are exchanged at this time, so that the host identifications on the masking layers are kept in conformity with the hosts corresponding to the masked display areas. Specifically, the masking layer on the first display area is exchanged with the masking layer on the second display area, to exchange the host identifications. Alternatively, the host identification displayed on the masking layer on the first display area is exchanged with the host identification displayed on the masking layer on the second display area.

For example, in an application scenario shown in FIG. 2d, where a masking layer 1 covers on the display area 2 corresponding to the host B and the avatar identification of the host B is displayed on the masking layer 1, and a masking layer 2 covers on the display area 3 corresponding to the host C and the avatar identification of the host C is displayed on the masking layer 2, the display image corresponding to the host B is exchanged with the display image corresponding to the host C, and at the same time the avatar identification of the host C is displayed on the masking layer 1 and the avatar identification of the host B is displayed on the masking layer 2.

The occasions for exchanging the host identifications on the masking layers are as follows. In one case, after the display switching request is received, the host identifications on the masking layers are exchanged first, and then the exchange of the display image corresponding to the first display area with the display image corresponding to the second display area is triggered. In another case, after the display switching request is received, the display image corresponding to the first display area is exchanged first with the display image corresponding to the second display area, and then the exchange of the host identifications on the masking layers is triggered. In still another case, after the display switching request is received, the exchange of the display images and the exchange of the host identifications are performed synchronously.

In an embodiment of the present disclosure, in the exchange of the host identifications on the masking layers, in order to show an exchange effect to the viewer, the exchange of host identifications on the masking layers is displayed in a way of scaling the host identifications, to improve the user's viewing experience. For example, a host identification initially displayed on the masking layer is scaled down first; subsequently, after the host identifications are exchanged, the exchanged host identification is scaled up.

Specifically, scaling of the host identification is performed by: scaling down the host identification on the first masking layer and the host identification on the second masking layer; before the display masking layers are cancelled, exchanging the host identification on the first masking layer with the host identification on the second masking layer in response to the completion of display switching; and scaling up the host identification on the first masking layer and the host identification on the second masking layer. The first masking layer is displayed on the first display area, and the second masking layer is displayed on the second display area. For example, the first masking layer is the masking layer 1 in FIG. 2d, and the second masking layer is the masking layer 2 in FIG. 2d. First, the host identification of the host B on masking layer 1 and the host identification of the host C on masking layer 2 are scaled down. After the display image under the masking layer 1 is exchanged with the display image under the masking layer 2, the host identification of the host C is displayed on the masking layer 1 and the host identification of the host B is displayed on the masking layer 2, and each host identification is scaled up.

Figure 2E:
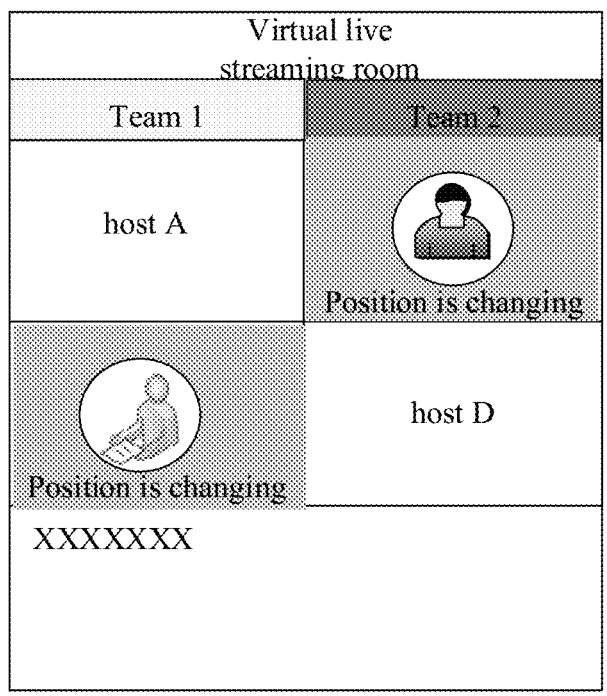
FIG. 2e is another schematic diagram showing covering with the masking layer according to an embodiment of the present disclosure.

In an embodiment of the present disclosure, the masking layer may further include prompt information in order to further help the user to understand the position adjustment of the display images of different hosts. The prompt information is used to prompt the user that the exchange is in the progress, to help the user to understand the meaning of existence of the masking layers and to avoid causing misunderstanding to the user. For example, as shown in FIG. 2e, the masking layer includes the host avatar corresponding to the masked host and the prompt information "position is changing".

In an embodiment of the present disclosure, in a case that the masking layer includes the prompt information, in response to the completion of switching, the displaying of the prompt information is stopped, to display a corresponding video stream.

It can be seen that the displayed live streaming room interface includes a first display area and a second display area. The first display area is configured to display a display image corresponding to the first host, and the second display area is configured to display a display image corresponding to the second host. In response to receiving a display switching request, a masking layer is displayed on the first display area and the second display area, to mask the image displayed on the display areas. After the display switching is completed, the display masking layers are canceled on the first display area and the second display area, and the display image corresponding to the second host is displayed in the first display area, and the display image corresponding to the first host is displayed in the second display area. That is, the display positions of the first host and the second host in the live streaming room are exchanged under the cover of the masking layers, to avoid the instantaneous hopping of the video stream on the viewing side to ensure the smooth viewing.

Based on the above method embodiments, a live video processing apparatus and device are provided according to the embodiments of the present disclosure, which will be described below in combination with the drawings.

Figure 3:
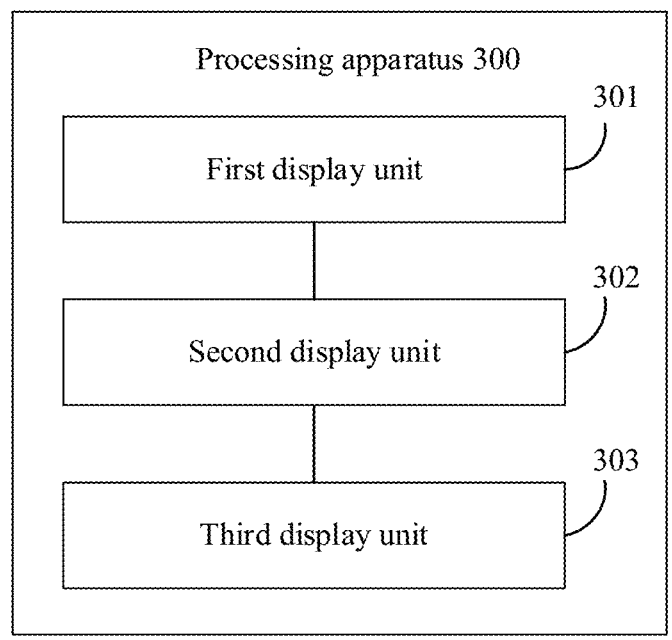
FIG. 3 is a schematic diagram showing a live video processing apparatus according to an embodiment of the present disclosure.

FIG. 3 is a structural diagram showing a live video processing apparatus according to an embodiment of the present disclosure. As shown in FIG. 3, the apparatus 300 includes a first display unit 301, a second display unit 302, and a third display unit 303.

The first display unit 301 is configured to display a live streaming room interface comprising a first display area and a second display area, display, in the first display area, a display image corresponding to a first host, and display, in the second display area, a display image corresponding to a second host.

The second display unit 302 is configured to: in response to a display switching request, display a masking layer on the first display area and the second display area;

The third display unit 303 is configured to: in response to the completion of switching, cancel the masking layer on the first display area and the second display area, and display the display image corresponding to the second host in the first display area, and display the display image corresponding to the first host in the second display area.

In an embodiment of the present disclosure, displaying, in the first display area, a display image corresponding to a first host, and displaying, in the second display area, a display image corresponding to a second host comprises: displaying the display image corresponding to the first host belonging to a first live streaming team in the first display area, and displaying the display image corresponding to the second host belonging to a second live streaming team in the second display area.

In an embodiment of the present disclosure, in response to a display switching request includes in response to a request to switch areas for displaying the first host and the second host.

In an embodiment of the present disclosure, in response to a request to switch areas for displaying the first host and the second host includes in response to a request to switch live streaming teams to which the first host and the second host belong.

In an embodiment of the present disclosure, the apparatus further includes a first exchange unit.

The first exchange unit is configured to: before the masking layers are cancelled on the first display area and the second display area, exchange the display image corresponding to the first display area with the display image corresponding to the second display area.

In an embodiment of the present disclosure, the first exchange unit is specifically configured to: exchange a display container on the first display area with a display container on the second display area, to exchange the display image corresponding to the first display area with the display image corresponding to the second display area; or exchange a live video stream in the display container on the first display area with a video stream in the display container on the second display area, to exchange the display image corresponding to the first display area with the display image corresponding to the second display area.

In an embodiment of the present disclosure, a host identification of the host corresponding to the display image displayed in a masked display area is displayed on the masking layer.

In an embodiment of the present disclosure, the apparatus further includes a second exchange unit.

The second exchange unit is configured to: in response to the display switching request, exchanging the host identifications on the masking layers.

In an embodiment of the present disclosure, the second exchange unit is specifically configured to display the exchange of the host identifications on the masking layers by scaling the host identifications.

In an embodiment of the present disclosure, the second exchange unit is specifically configured to: scale down the host identification on a first masking layer and the host identification on a second masking layer, where the first masking layer is the masking layer displayed on the first display area, and the second masking layer is the masking layer displayed on the second display area; before the display masking layers are cancelled, exchange the host identification on the first masking layer with the host identification on the second masking layer in response to the completion of switching; and scale up the host identification on the first masking layer and the host identification on the second masking layer.

In an embodiment of the present disclosure, the apparatus further includes a fourth exchange unit.

The fourth exchange unit is configured to: before the completion of switching, display prompt information on the masking layer, where the prompt information is configured to prompt that an exchange is in progress.

In an embodiment of the present disclosure, the apparatus further includes a control unit.

The control unit is configured to: in response to the completion of switching, stop the display of the prompt information.

It should be noted that, for the specific implementation of each of units in this embodiment, reference may be made to the relevant description in the embodiments of the method described above.

The units in the embodiment of the present disclosure are divided exemplarily, which are divided only based on a logical function. There may be other division methods in practical application. In addition, all function units according to the embodiment of the present disclosure may be integrated into one processing unit, or may be a physically separate unit, or may be one unit that is integrated by two or more units. For example, in the above embodiment, a processing unit and a sending unit may be the same unit, or may be different units. The integrated unit may be implemented in a form of hardware, or in a form of a software function unit.

Figure 4:
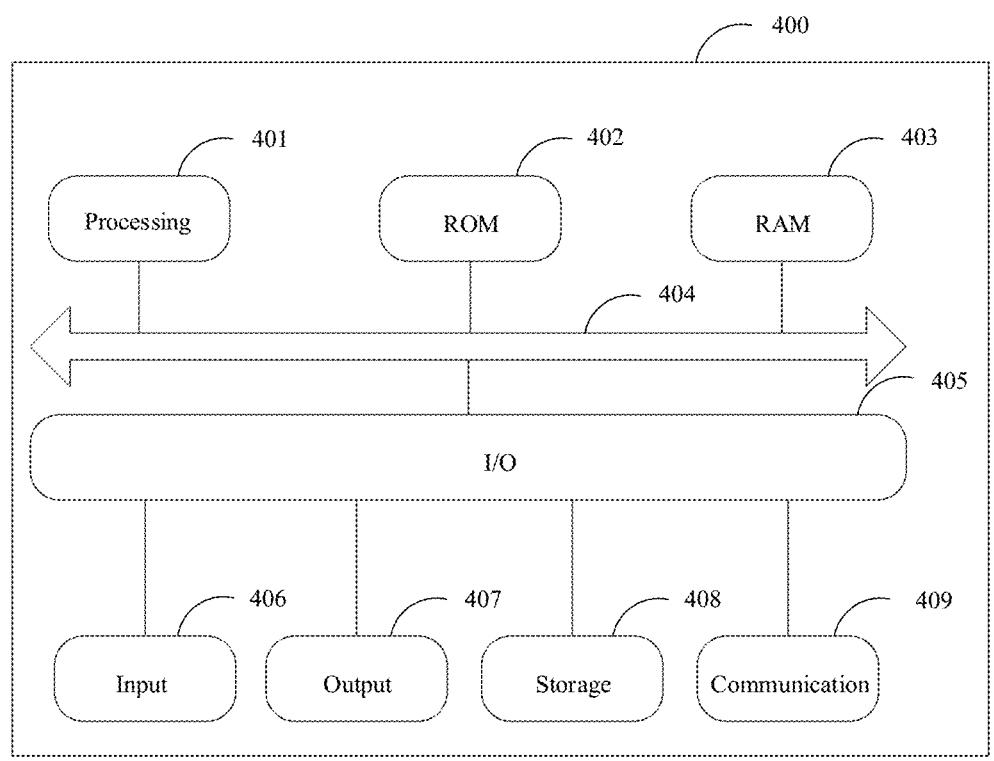
FIG. 4 is a schematic structural diagram of an electronic device according to an embodiment of the present disclosure.

Reference is made to FIG. 4, which shows a schematic structural diagram of an electronic device suitable for implementing the embodiments of the present disclosure. The electronic device in the embodiments of the present disclosure may include, but is not limited to, a mobile terminal, such as a mobile phone, a notebook computer, a digital broadcast receiver, a PDA (Personal Digital Assistant), a PAD (Tablet computer), a PMP (Portable Multimedia Player), a vehicle-mounted terminal (such as an in-vehicle navigation terminal), and a fixed terminal such as a digital TV, a desktop computer. The electronic device shown in FIG. 4 is only an example, and should not impose any limitation on the functions and applications of the embodiments of the present disclosure.

As shown in FIG. 4, the electronic device 400 may include a processing device (such as a central processing unit, and a graphics processor) 401 that may execute various appropriate actions and processes according to a program stored in a read only memory (ROM) 402 or loaded into random access memory (RAM) 403 from a storage device 408. Various programs and data necessary for the operation of the electronic device 400 are also stored in the RAM 403. The processing device 401, the ROM 402, and the RAM 403 are connected to each other through a bus 404. An input/output (I/O) interface 405 is also connected to the bus 404.

Generally, the following devices may be connected to the I/O interface 405: an input device 406 such as a touch screen, a touchpad, a keyboard, a mouse, a camera, a microphone, an accelerometer, a gyroscope, and the like; an output device 407, such as a liquid crystal display (LCD), a speaker, a vibrator, and the like; a storage device 408, such as a magnetic tape, a hard disk, and the like; and a communication device 409. The communication device 409 may enable the electronic device 400 to communicate in a wireless or wired manner with other devices to exchange data. Although FIG. 4 shows the electronic device 400 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 409, or from the storage device 408, or from the ROM 402. When the computer program is executed by the processing device 401, the above-mentioned functions in the methods of the embodiments of the present disclosure are executed.

The electronic device according to the embodiments of the present disclosure and the method according to the above embodiment belong to the same inventive concept. For the technical details not described in detail in this embodiment, reference may be made to the embodiments described above. Moreover, this embodiment has the same beneficial effects as the embodiments described above.

A computer storage medium storing a computer program is provided according to the embodiment of the present disclosure. The program, when executed by a processor, performs the method according to the embodiments described above.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium may be any computer-readable medium other than a computer-readable storage medium that can transmit, propagate, or transport the program for use by or in connection with the instruction execution system, apparatus or device. Program code stored on a computer readable medium may be transmitted using any suitable medium, including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (e.g., the Internet), and peer-to-peer networks (such as ad hoc peer-to-peer networks), as well as any current or future network.

The above-mentioned computer-readable medium may be included in the above-mentioned electronic device, or may stand alone without being assembled into the electronic device.

The computer-readable medium carries one or more programs. The one or more programs, when executed by the electronic device, cause the electronic device to implement the method described above.

Computer program codes for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user's computer through any kind of network, including a local area network (LAN) or a wide area network (WAN), or may be connected to an external computer (e.g., using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in a reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform specified functions or operations, or may be implemented by a combination of dedicated hardware and computer instructions.

The units involved in the embodiments of the present disclosure may be implemented in a software manner, or in a hardware manner. The name of the units/modules does not constitute a limitation of the unit under any circumstances.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable medium may include, but is not limited to, a system, an apparatuses, or a device in an electronic, magnetic, optical, electromagnetic, infrared, or semiconductor form, or any proper combination thereof. More specific examples of machine-readable storage medium include one or more wire-based electrical connections, a portable computer disk, a hard disk, a random access memory (RAM), a read only memory (ROM), an erasable programmable read only memory (EPROM or a flash memory), a fiber optic, a portable compact disk read only memory (CD-ROM), an optical storage device, a magnetic storage device, or any proper combination thereof.

It should be noted that embodiments in this specification are described in a progressive manner. Each embodiment focuses on differences from other embodiments, and reference may be made among these embodiments with respect to the same or similar parts. Since the system or the apparatus disclosed in the embodiments corresponds to the method disclosed in the embodiment, the description for the system or the apparatus is simple, and reference may be made to the embodiment of the method for the relevant parts.

It should be understood that in the present disclosure, the term "at least one" refers to a quantity equal to one or more, and the term "multiple" refers to a quantity equal to two or more. The term "and/or" are used to describe an association relationship between objects, and indicates three possible relationships. For example, "A and/or B" may indicate a case that there is only A, a case that there is only B, and a case that there are both A and B. In each case, a quantity of A may be one or more, and a quantity of B may be one or more. The symbol "/" generally indicates that a former object and a latter object are associated by an "or" relationship. The term "at least one of" or a similar expression refers to "any combination of", including any combination consisting of a single item or multiple items. For example, a statement "at least one of a, b, or c" may indicate a case of "only a", a case of "only b", a case of "only c", a case of "a and b", a case of "a and c", a case of "b and c", or a case of "both a, b and c", where a, b, and c may be single or multiple.

It should be noted that, the relationship terms such as "first", "second" and the like are only used herein to distinguish one entity or operation from another, rather than to necessitate or imply that an actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Unless expressively limited otherwise, a statement of "comprising (including) one . . . " does not exclude a case that other similar elements exist in the process, method, article or device.

The steps of the method or algorithm described according to the embodiments disclosed herein may be implemented in forms of hardware, a software module executed by a processor or the combination of the both. The software module may be stored in a Random Access Memory (RAM), a memory, a Read-Only Memory (ROM), an electrical programmable ROM, an electrically erasable programmable ROM, a register, a hardware disk, a removable magnetic disk, a CD-ROM, or any other forms of storage medium well known in the art.

With the description of the embodiments disclosed above, those skilled in the art may implement or use technical solutions of the present disclosure. Various modifications to the embodiments are obvious to those skilled in the art, and general principles defined in the present disclosure may be implemented in other embodiments without departing from the spirit or scope of the present disclosure. Therefore, the present disclosure shall not be limited to the embodiments described herein but have the widest scope that complies with the principle and novelty disclosed in this specification.

The invention claimed is:

1. A live video processing method, comprising:
   displaying a live streaming room interface, the live streaming room interface comprising a first display area and a second display area, displaying, in the first display area, a display image corresponding to a first host, and displaying, in the second display area, a display image corresponding to a second host;
   in response to a display switching request, displaying a masking layer on the first display area and the second display area;
   in response to completion of switching, cancelling the masking layer on the first display area and the second display area, displaying, in the first display area, the display image corresponding to the second host, and displaying, in the second display area, the display image corresponding to the first host.

2. The method according to claim 1, wherein displaying, in the first display area, a display image corresponding to a first host, and displaying, in the second display area, a display image corresponding to a second host comprises:
   displaying the display image corresponding to the first host belonging to a first live streaming team in the first display area, and displaying the display image corresponding to the second host belonging to a second live streaming team in the second display area.

3. The method according to claim 2, wherein in response to a display switching request comprises in response to a request to switch live streaming teams to which the first host and the second host belong.

4. The method according to claim 1, wherein in response to a display switching request comprises in response to a request to switch areas for displaying the first host and the second host.

5. The method according to claim 1, wherein before cancelling the masking layer on the first display area and the second display area in response to the completion of switching, the method further comprises:
   exchanging the display image corresponding to the first display area with the display image corresponding to the second display area.

6. The method according to claim 5, wherein exchanging the display image corresponding to the first display area with the display image corresponding to the second display area comprises:
   exchanging position of a display container on the first display area with position of a display container on the second display area, to exchange the display image corresponding to the first display area with the display image corresponding to the second display area; or
   exchanging a live video stream in the display container on the first display area with a live video stream in the display container on the second display area, to exchange the display image corresponding to the first display area with the display image corresponding to the second display area.

7. The method according to claim 1, wherein a host identification of the host corresponding to the display image displayed in the display area masked by the masking layer is displayed on the masking layer.

8. The method according to claim 7, further comprising:
   in response to the display switching request, exchanging the host identifications on the masking layers.

9. The method according to claim 8, wherein exchanging the host identifications on the masking layers comprises displaying the exchange of the host identifications on the masking layers by scaling the host identifications.

10. The method according to claim 9, wherein displaying the exchange of the host identifications on the masking layers by scaling the host identifications comprises:
    scaling down the host identification on a first masking layer and the host identification on a second masking layer, wherein the first masking layer is the masking layer displayed on the first display area, and the second masking layer is the masking layer displayed on the second display area;
    before the display masking layers are cancelled, exchanging the host identification on the first masking layer with the host identification on the second masking layer in response to the completion of the switching; and
    scaling up the host identification on the first masking layer and the host identification on the second masking layer.

11. The method according to claim 7, further comprising:
    before the completion of the switching, displaying prompt information on the masking layer, wherein the prompt information is configured to prompt that an exchange is in progress.

12. The method according to claim 11, further comprising:
    in response to the completion of the switching, stopping the display of the prompt information.

13. An electronic device comprising a processor and a memory, wherein
    the memory is configured to store instructions or computer programs; and
    the processor is configured to execute the instructions or computer programs in the memory to cause the electronic device to execute:
    displaying a live streaming room interface, the live streaming room interface comprising a first display area and a second display area, displaying, in the first display area, a display image corresponding to a first host, and displaying, in the second display area, a display image corresponding to a second host;
    in response to a display switching request, displaying a masking layer on the first display area and the second display area;
    in response to completion of switching, cancelling the masking layer on the first display area and the second display area, displaying the display image corresponding to the second host in the first display area, and displaying the display image corresponding to the first host in the second display area.

14. The electronic device according to claim 13, wherein the processor is further configured to execute the instructions or computer programs in the memory to cause the electronic device to execute:
    displaying the display image corresponding to the first host belonging to a first live streaming team in the first display area, and displaying the display image corresponding to the second host belonging to a second live streaming team in the second display area.

15. The electronic device according to claim 13, wherein the processor is further configured to execute the instructions or computer programs in the memory to cause the electronic device to execute:
    exchanging the display image corresponding to the first display area with the display image corresponding to the second display area.

16. The electronic device according to claim 15, wherein the processor is further configured to execute the instructions or computer programs in the memory to cause the electronic device to execute:
    exchanging position of a display container on the first display area with position of a display container on the second display area, to exchange the display image corresponding to the first display area with the display image corresponding to the second display area; or
    exchanging a live video stream in the display container on the first display area with a live video stream in the display container on the second display area, to exchange the display image corresponding to the first display area with the display image corresponding to the second display area.

17. The electronic device according to claim 13, wherein a host identification of the host corresponding to the display image displayed in the display area masked by the masking layer is displayed on the masking layer.

18. The electronic device according to claim 17, wherein the processor is further configured to execute the instructions or computer programs in the memory to cause the electronic device to execute:
    in response to the display switching request, exchanging the host identifications on the masking layers.

19. The electronic device according to claim 18, wherein the processor is further configured to execute the instructions or computer programs in the memory to cause the electronic device to execute:
    displaying the exchange of the host identifications on the masking layers by scaling the host identifications.

20. A non-transitory computer readable storage medium having instructions stored thereon, the instructions, when running on a device, cause the device to perform:
    displaying a live streaming room interface comprising a first display area and a second display area, displaying, in the first display area, a display image corresponding to a first host, and displaying, in the second display area, a display image corresponding to a second host;
    in response to a display switching request, displaying a masking layer on the first display area and the second display area;
    in response to completion of switching, cancelling the masking layer on the first display area and the second display area, displaying the display image corresponding to the second host in the first display area, and displaying the display image corresponding to the first host in the second display area.

* * * * *